US012798712B2

(12) United States Patent
Wang et al.

(10) Patent No.: US 12,798,712 B2
(45) Date of Patent: Nov. 17, 2026

(54) HIGH-TRAFFICABILITY ALL-TERRAIN VEHICLE FOR FLOODED AND MUDDY ROADS

(71) Applicant: Shandong Odes Industry Co., Ltd., Zibo (CN)

(72) Inventors: Renfeng Wang, Zibo (CN); Ziliang Wang, Zibo (CN); Jianping Lu, Zibo (CN); Kun Hu, Zibo (CN); Deqing Liu, Zibo (CN); Yan Liu, Zibo (CN); Pengxiang Gao, Zibo (CN)

(73) Assignee: Shandong Odes Industry Co., Ltd., Zibo (CN)

( * ) Notice: Subject to any disclaimer, the term of this patent is extended or adjusted under 35 U.S.C. 154(b) by 294 days.

(21) Appl. No.: 18/645,410

(22) Filed: Apr. 25, 2024

(65) Prior Publication Data

US 2024/0367744 A1 Nov. 7, 2024

(30) Foreign Application Priority Data

May 6, 2023 (CN) ......................... 202310526750.1
May 6, 2023 (CN) ......................... 202321116555.3

(51) Int. Cl.
*B62K 5/01* (2013.01)

(52) U.S. Cl.
CPC ..................................... *B62K 5/01* (2013.01)

(58) Field of Classification Search
CPC .......... B62K 5/01; B62K 11/02; B62K 11/04; B62K 11/06; B62K 17/342
See application file for complete search history.

(56) References Cited

U.S. PATENT DOCUMENTS 6,622,806 B1 * 9/2003 Matsuura ................. B62J 50/30 180/908
6,626,260 B2 * 9/2003 Gagnon ................. B60K 15/01 180/908
6,892,842 B2 * 5/2005 Bouffard .......... F02M 35/10262 180/68.3
7,347,296 B2 * 3/2008 Nakamura ............... B62K 5/01 180/68.1
7,475,748 B2 * 1/2009 Nakamura ............... B62K 5/01 180/68.1
8,196,689 B2 * 6/2012 Hosoda .................... B62K 5/01 180/68.5
9,587,689 B2 * 3/2017 Pongo .................... B60K 17/22
9,649,928 B2 * 5/2017 Danielson .............. B60K 11/06
9,873,316 B2 * 1/2018 Lovold .................... B62K 5/01
(Continued)

*Primary Examiner* — Jeffrey J Restifo
(74) *Attorney, Agent, or Firm* — Bayramoglu Law Offices LLC

(57) ABSTRACT

A high-trafficability ATV for flooded and muddy roads is provided. The ATV includes a frame assembly, wheels, an engine power system, a continuously variable transmission (CVT) system, a cooling system, and a fuel system, where the cooling system includes a radiator and a radiator fan that are arranged at a front upper part of an ATV body. The radiator and radiator fan adopt a high-position design to improve the ATV's heat dissipation and wading performance. Besides, CVT intake and exhaust lines, an air filter, front and rear reducers, a gearbox, and fuel tank intake and exhaust ports also adopt a high-position design, fully leveraging the wading advantage of a suspension system of the ATV and maximizing the wading depth of the ATV.

9 Claims, 9 Drawing Sheets

(56) References Cited

U.S. PATENT DOCUMENTS

| | | | | |
|---|---|---|---|---|
| 10,946,736 | B2 * | 3/2021 | Fischer | B60K 17/34 |
| 11,420,516 | B2 * | 8/2022 | Evans | F02D 11/02 |
| 12,084,145 | B2 * | 9/2024 | Sorenson | B62L 3/023 |
| 12,280,828 | B2 * | 4/2025 | Fang | B62K 5/01 |
| 12,330,738 | B2 * | 6/2025 | Sorenson | B62K 5/08 |
| 12,503,191 | B2 * | 12/2025 | Yoshida | B62K 5/007 |
| 2004/0124028 | A1 * | 7/2004 | Lachapelle | B60K 11/04<br>180/291 |
| 2017/0246952 | A1 * | 8/2017 | Danielson | B60F 5/003 |
| 2022/0266908 | A1 * | 8/2022 | Kemp | B60L 50/66 |
| 2023/0365215 | A1 * | 11/2023 | Purcell | B62J 1/12 |
| 2024/0083538 | A1 * | 3/2024 | Bouchard | B62M 7/06 |
| 2024/0367744 | A1 * | 11/2024 | Wang | B62K 5/01 |
| 2024/0375505 | A1 * | 11/2024 | Wang | B62K 5/01 |
| 2025/0121912 | A1 * | 4/2025 | Rousseau | B62J 43/28 |

* cited by examiner

HIGH-TRAFFICABILITY ALL-TERRAIN VEHICLE FOR FLOODED AND MUDDY ROADS

CROSS-REFERENCE TO THE RELATED APPLICATIONS

This application is based upon and claims priority to Chinese Patent Application No. 202310526750.1, filed on May 6, 2023; and Chinese Patent Application No. 202321116555.3, filed on May 6, 2023, the entire contents of which are incorporated herein by reference.

TECHNICAL FIELD

The present disclosure relates to a high-trafficability all-terrain vehicle (ATV) for flooded and muddy roads, and belongs to the technical field of ATVs.

BACKGROUND

All-terrain vehicles (ATVs), commonly known as "beach buggies" and "quad bikes," are simple and practical, with excellent off-road performance. ATVs rely on their wide tires to increase the contact area with the ground, thereby increasing friction and reducing the ATV's pressure on the ground. Therefore, ATVs are easy to run on harsh terrains such as beaches, river beds, forest roads, streams, and deserts to transport people or goods.

There are various models of ATVs available in the market, covering engines displacements ranging from 100 cc to 1,000 cc. The suspension systems of these ATVs can meet the needs of large travel and high ground clearance, but cannot leverage their wading advantage due to some drawbacks.

1. The layout of the engine cooling system is basically the same for ATVs. The radiator is vertically fixed at the front of the ATV, ensuring good heat dissipation performance of the radiator. However, due to the fact that the radiator and radiator fan fixed to the front of ATVs are at a small height, when ATVs are running on complex terrains (especially on muddy roads), the radiator is very likely to be covered by mud or other things. This will greatly reduce the heat dissipation efficiency of the radiator, thereby affecting engine heat dissipation and even damaging the engine. Furthermore, the radiator is difficult to clean due to its layout position.

2. The engine of the ATV adopts belt-type continuously variable transmission (CVT), and the CVT casing needs to be ventilated and cooled. However, when the ATV enters a certain depth of water, water will be poured into the CVT casing through the intake and exhaust pipes, which will cause the transmission belt and drive and driven wheels to slip, resulting in power failure and causing the ATV to roar without moving.

3. In the fuel system, as gasoline evaporates and fuel is consumed, the pressure balance inside the fuel tank is adjusted through a pressure valve of the fuel tank cap. When the ATV is wading in water, while ventilation is performed through the fuel tank cap, water is likely to enter the fuel tank through the pressure valve of the fuel tank cap, thereby causing fuel abnormalities.

4. The tire structure of ordinary ATVs are not suitable for complex muddy and flooded roads, and cannot achieve ideal trafficability. After the ATV enters excessively deep waters where the water depth is greater than ATV's height, it will sink rapidly due to its own weight and cannot rapidly traverse the waters through buoyancy and power coordination.

SUMMARY

In response to the shortcomings in the prior art mentioned above, a technical problem to be solved by the present disclosure is to provide a high-trafficability all-terrain vehicle (ATV) for flooded and muddy roads. The present disclosure optimizes the structure of the ATV and improves the trafficability of the ATV, such that the ATV can move forward in water in a nearly completely submerged state.

The high-trafficability ATV for flooded and muddy roads includes a frame assembly, wheels, an engine power system, a continuously variable transmission (CVT) system, a cooling system, and a fuel system, where the cooling system includes a radiator and a radiator fan that are arranged at a front upper part of an ATV body and at a height of 1,070-1,100 mm.

In addition, an insulation cover is provided outside an engine exhaust pipe of the engine power system. The insulation cover is provided between the engine exhaust pipe and an ATV housing to prevent the driving experience from being affected by overheating of the ATV housing.

Further, the CVT system includes a CVT box; the CVT box is connected to a CVT intake pipe; an intake port of the CVT intake pipe is at a height of 1,020-1,250 mm; the CVT box is further connected to a CVT exhaust line; the CVT exhaust line includes a CVT exhaust pipe I, an elbow, and a CVT exhaust pipe II that are sequentially connected; the elbow is higher than the CVT exhaust pipe I and the CVT exhaust pipe II and at a height of 1,050-1,090 mm to increase the height of the CVT exhaust line and improve wading performance; and an exhaust port of the CVT exhaust pipe II faces the engine exhaust pipe inside the insulation cover and has an exhaust direction along a length direction of the engine exhaust pipe, allowing a discharged gas to enter the insulation cover to form a cooling gas path for heat dissipation of the engine exhaust pipe.

In the present disclosure, an air filter of an engine is connected to an air filter intake pipe I through an air filter intake pipe II; an intake port of the air filter intake pipe I is at a height of 1,060-1,250 mm; a middle position inside the air filter is provided with a filter screen; the filter screen separates an inner chamber of the air filter into a left filter chamber and a right filter chamber; bottoms of the left filter chamber and the right filter chamber are respectively provided with a front leakage port and a rear leakage port; the front leakage port and the rear leakage port are connected to a drainage line; the air filter adopts a layered design; once water enters the air filter, it will be prevented to some extent from entering an engine combustor, further maximizing a wading depth; in addition, the drainage line is transparent and can visually display the water accumulation condition therein; and a tail end of the drainage line is provided with a drainage valve, which is configured to timely discharge the water inside the air filter.

Further, the bottom of the left filter chamber is provided with a collection channel; and the front leakage port is provided at a lowest point of the collection channel.

The fuel system includes a fuel tank; the fuel tank is connected to a ventilation line; a ventilation port of the ventilation line is at a height of 1,060-1,250 mm; an oil pump cover of the fuel tank is connected to a ventilation pipe I; the ventilation pipe I is connected to a fuel tank exhaust pipe and a fuel tank intake pipe through a tee junction I; the fuel tank exhaust pipe and the fuel tank intake pipe are connected to a ventilation pipe II through a tee junction II; the fuel tank exhaust pipe is provided with an exhaust one-way pressure valve; the fuel tank intake pipe is provided with an intake one-way pressure valve and a gasoline filter; the present disclosure improves the ventilation structure of an original fuel tank cap by replacing the original fuel tank cap with a sealed fuel tank cap and moving the ventilation structure to the oil pump cover to ensure a wading depth; the intake and exhaust pressures are balanced through an internal line (when fuel evaporates, the pressure inside the fuel tank increases, and when fuel is consumed, the pressure inside the fuel tank decreases); and the air is filtered during intake.

Preferably, an opening pressure of the exhaust one-way pressure valve is greater than an opening pressure of the intake one-way pressure valve; the intake opening pressure is 2 kpa and the exhaust opening pressure is 5 kpa to prevent fuel leakage; and the pressure is supplemented in a timely manner during intake to prevent insufficient fuel supply.

In the present disclosure, the wheel is provided with an anti-detachment hub including a pressure plate; a front wheel has a diameter equal to a diameter of a rear wheel and a width smaller than a width of the rear wheel; the dimensions of front and rear tires are increased to increase the ATV's buoyancy in water and improve its wading performance; in addition, considering that the center of gravity of the ATV and personnel is located at the rear during driving, the width of the rear wheel is greater than that of the front wheel, so as to improve driving stability during wading; with the ant-detachment hub including the pressure plate, the tires are suitable for complex road conditions; and the tire pressure can be reduced to increase the contact area with the ground, thereby enhancing road holding and avoiding air leakage.

In the present disclosure, the radiator is fixed and inclined at a 20-40° angle to a ground; the radiator is externally provided with an outer cover and a protective mesh; and two sides of the radiator are provided with protective brackets that are connected to a bumper to provide protection and strength support.

In the present disclosure, the CVT intake and exhaust lines, the air filter, the front and rear reducers, the gearbox, and the fuel tank intake and exhaust ports all adopt a high-position design, fully leveraging the wading advantages of the suspension system of the ATV to maximize the wading depth. The radiator and radiator fan also adopt a high-position design to improve the heat dissipation and wading performance.

Compared with the prior art, the present disclosure has the following beneficial effects.

In the present disclosure, the high-trafficability ATV for flooded and muddy roads has the off-road performance, high torque, and high trafficability of ordinary ATVs. The present disclosure particularly improves the wading performance of the ATV such that the ATV can leverage the wading advantage of the suspension system. Therefore, the ATV can move forward in water in a nearly completely submerged state, and when the ATV enters excessively deep waters, it can rapidly traverse the waters through buoyancy and power coordination. In addition, the ATV has a rugged appearance and broad market prospects.

Figure 1:
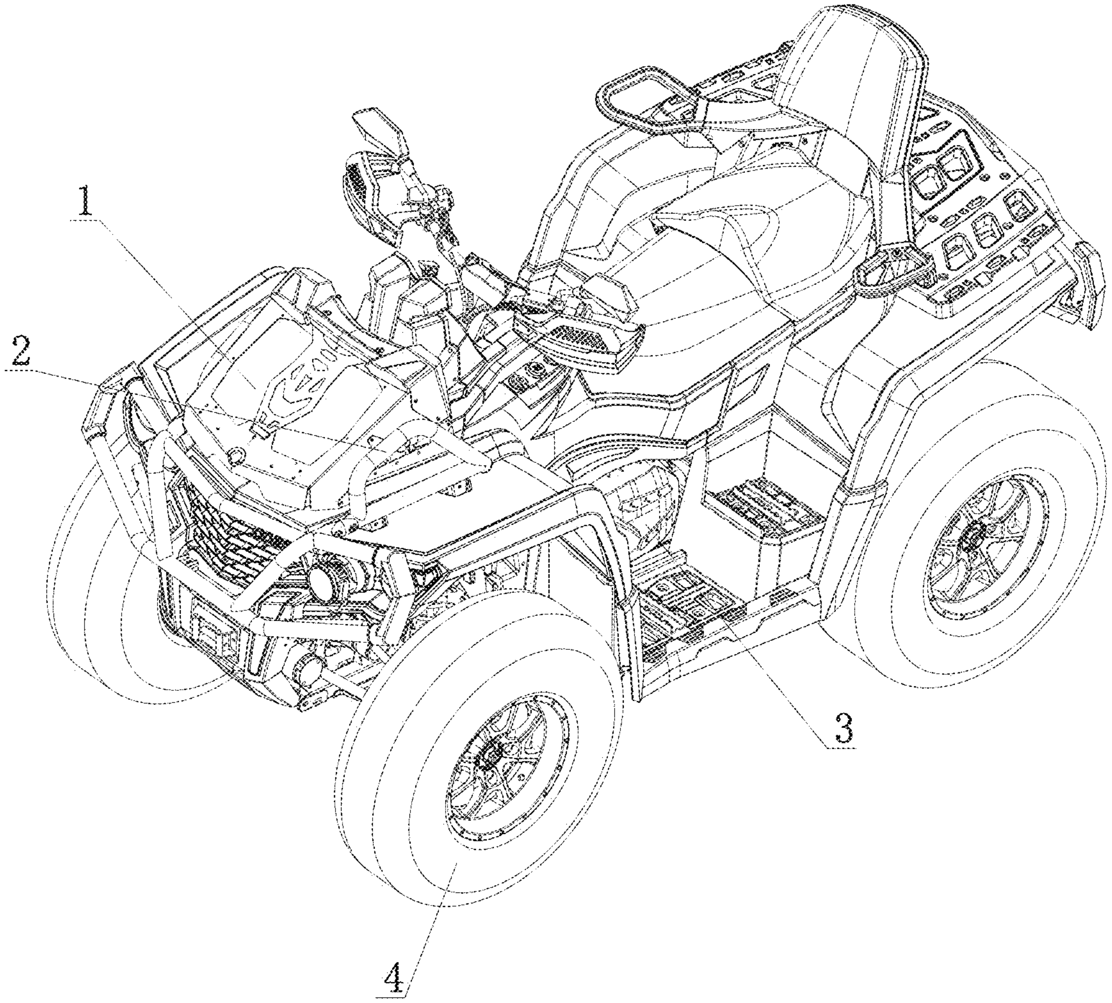
FIG. 1 is a first three-dimensional structural diagram of a high-trafficability all-terrain vehicle (ATV) for flooded and muddy roads according to the present disclosure.

Reference Numerals: 1. radiator; 2. protective bracket; 3. CVT; 4. wheel; 4.1. front wheel; 4.2. rear wheel; 5. fuel tank cap; 6. CVT intake pipe; 7. CVT exhaust pipe I; 8. elbow; 9. CVT exhaust pipe II; 10. insulation cover; 11. engine exhaust pipe; 12. air filter intake pipe I; 13. air filter; 14. fuel tank; 15. oil pump cover; 16. ventilation pipe I; 17. tee junction I; 18. fuel tank exhaust pipe; 19. exhaust one-way pressure valve; 20. fuel tank intake pipe; 21. intake one-way pressure valve; 22. gasoline filter; 23. tee junction II; 24. ventilation pipe II; 25. left filter chamber drainage pipe; 26. right filter chamber drainage pipe; 27. air filter intake pipe II; 28. filter screen; 29. air filter exhaust pipe; 30. collection channel; 31. front leakage port; 32. rear leakage port; 33. hub; 34. pressure plate; 35. suspension system; 36. drainage valve; 37. crankcase connection pipe; and 38. raised pipe.

DETAILED DESCRIPTION OF THE EMBODIMENTS

In response to the shortcomings of the prior art, the present disclosure proposes a structurally reasonable high-trafficability all-terrain vehicle (ATV) for flooded and muddy roads.

Figure 2:
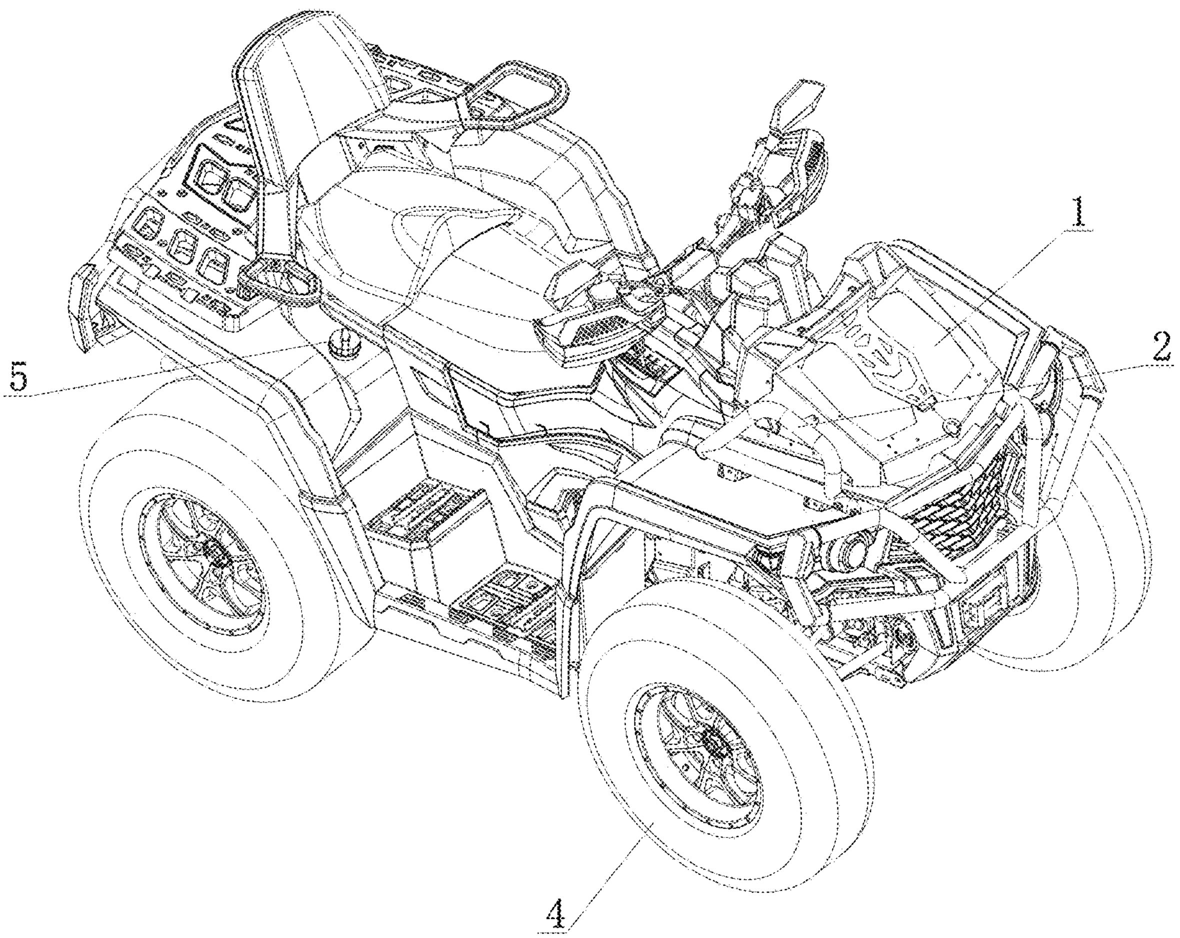
FIG. 2 is a second three-dimensional structural diagram of the high-trafficability ATV for flooded and muddy roads according to the present disclosure.
Figure 3:
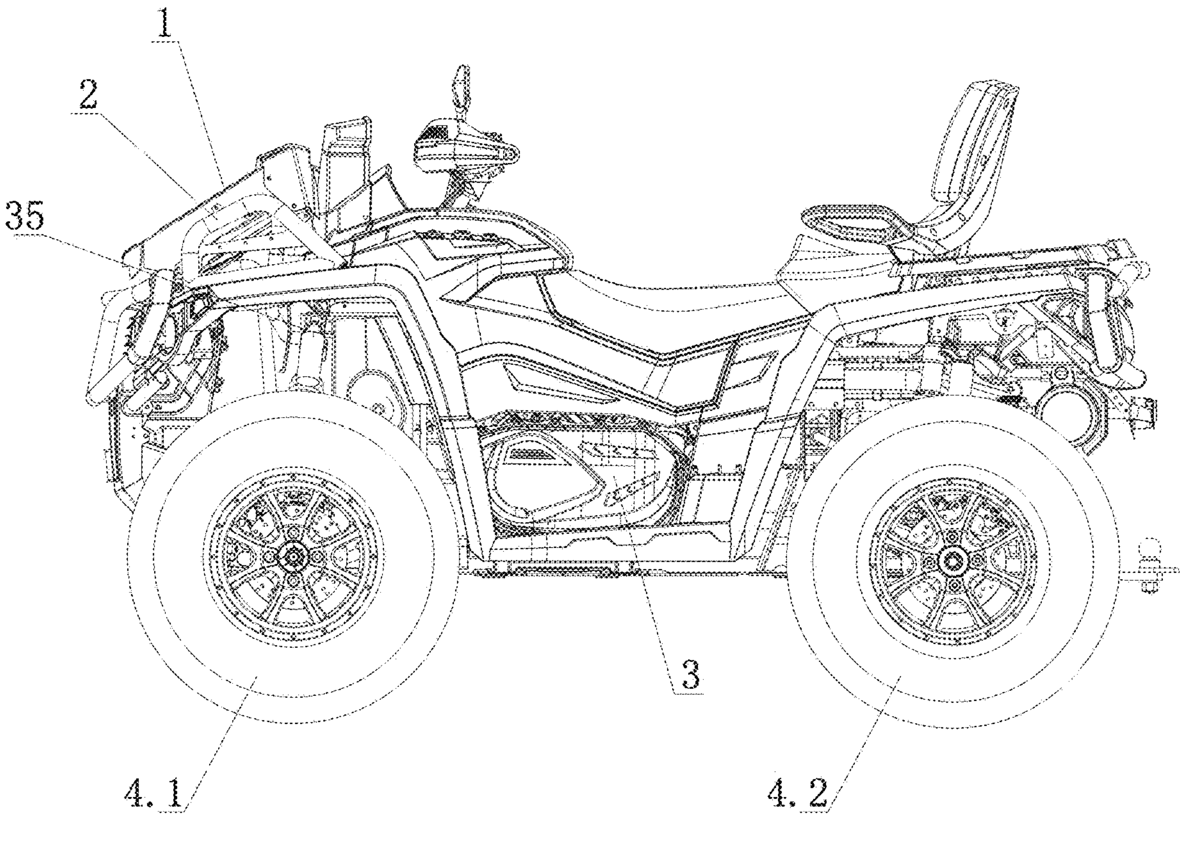
FIG. 3 is a lateral view of the high-trafficability ATV for flooded and muddy roads according to the present disclosure.
Figure 4:
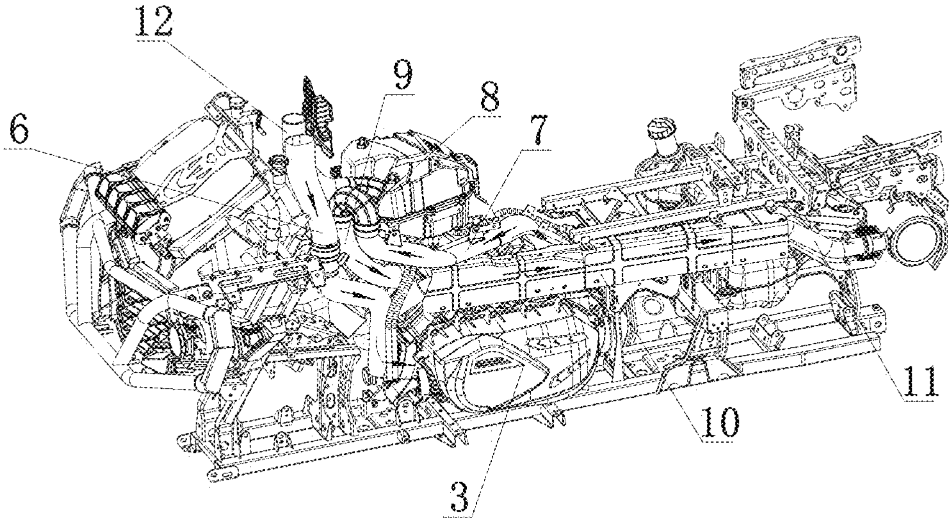
FIG. 4 is a first structural diagram of an ATV body.
Figure 5:
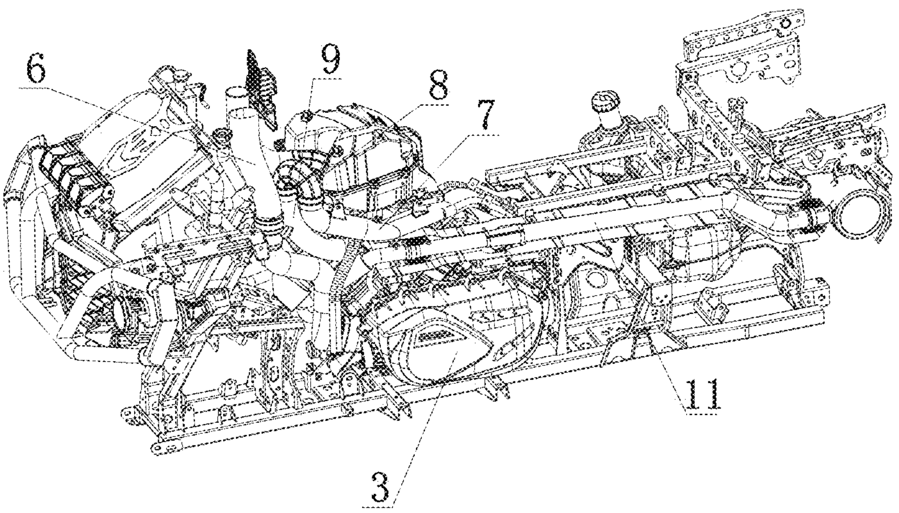
FIG. 5 is a schematic diagram of the ATV body shown in FIG. 4, with an insulation cover hidden.
Figure 6:
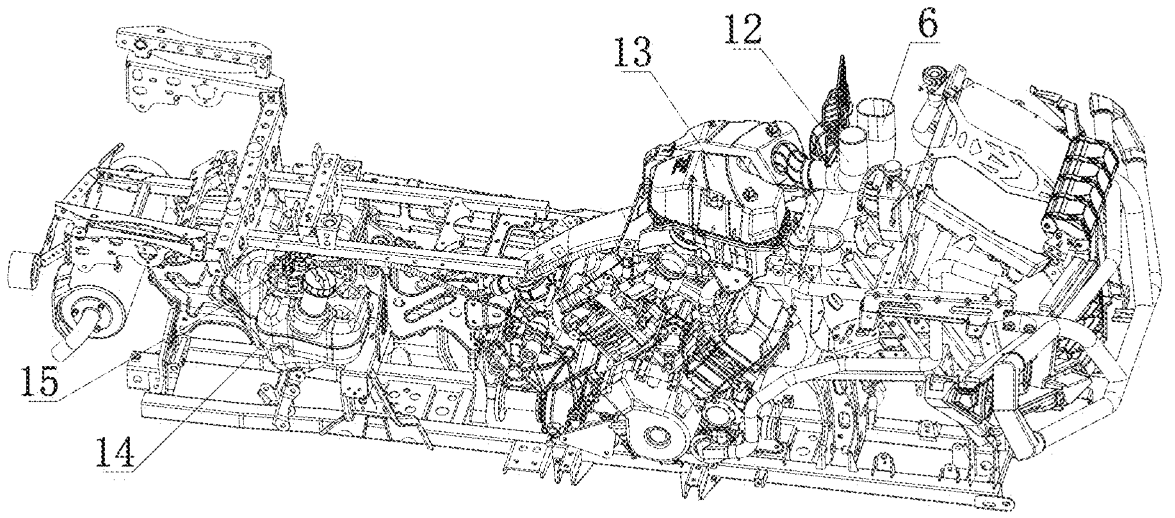
FIG. 6 is a second structural diagram of the ATV body.
Figure 7:
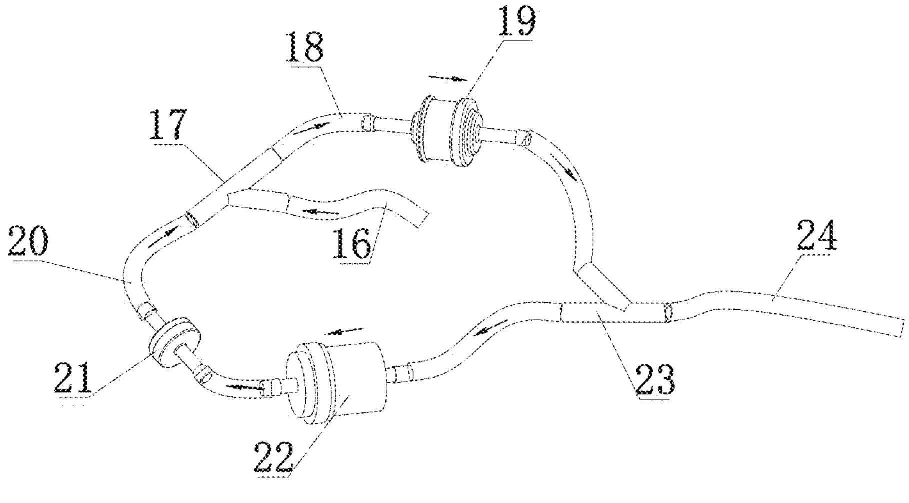
FIG. 7 is a structural diagram of a ventilation line of a fuel tank.
Figure 8:
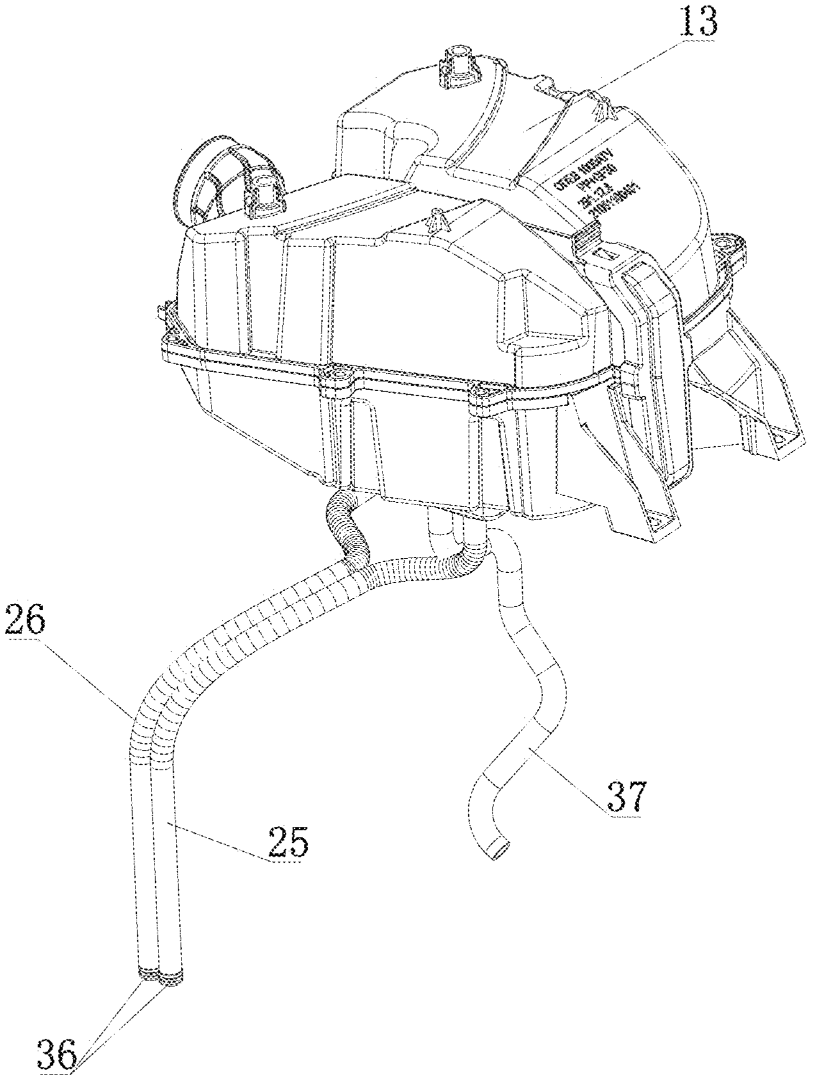
FIG. 8 is a first overall structural diagram of an air filter.
Figure 9:
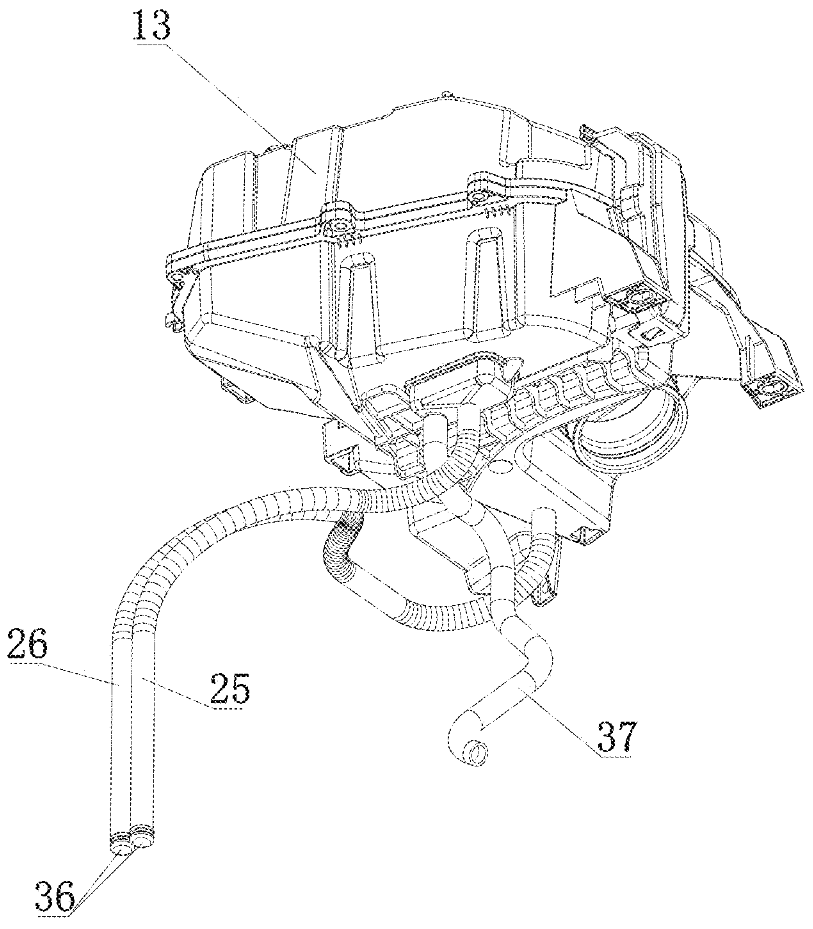
FIG. 9 is a second overall structural diagram of the air filter.
Figure 10:
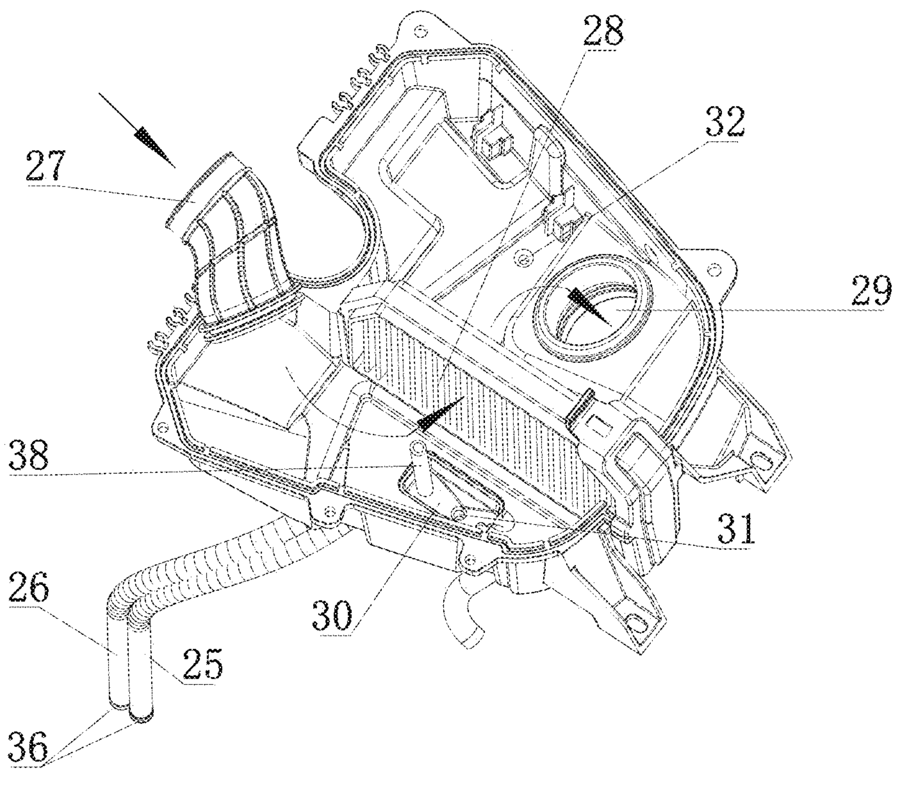
FIG. 10 is an internal structural diagram of the air filter.
Figure 11:
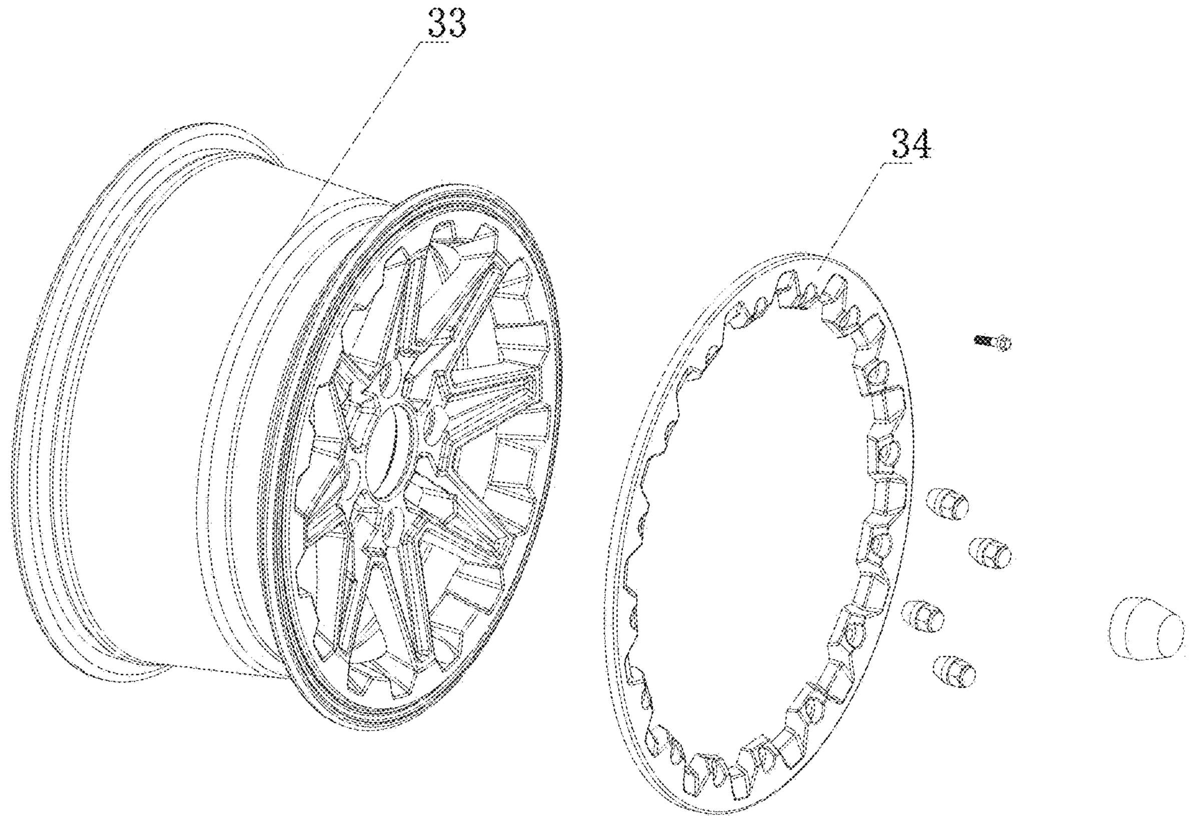
FIG. 11 is a structural diagram of a hub.

As shown in FIGS. 1 to 11, in an embodiment, the high-trafficability ATV for flooded and muddy roads mainly includes a frame assembly, wheels 4, an engine power system, a continuously variable transmission (CVT) system, a cooling system, and a fuel system, etc.

This embodiment optimizes the layout of the cooling system. The cooling system includes radiator 1 and radiator fan that are arranged at a front upper part of an ATV body, higher than suspension system 35 of a frame and at a height of 1,070 mm. The radiator 1 is fixed and inclined at a 32° angle to a ground, meeting an optimal design angle for layout and heat dissipation. The radiator 1 is protected with an outer cover and a protective mesh. Protective brackets 2 are arranged at two both sides of the radiator 1. The protective brackets 2 are connected to a bumper to provide strength support.

In this embodiment, engine exhaust pipe 11 is protected with insulation cover 10. The insulation cover 10 is provided between the engine exhaust pipe 11 and an ATV housing to prevent the driving experience from being affected by the overheating of the ATV housing.

In this embodiment, the CVT system includes CVT box 3. The CVT box 3 is connected to CVT intake pipe 6. An intake port of the CVT intake pipe 6 is at a height of 1,250 mm. The CVT box 3 is further connected to CVT exhaust line. The CVT exhaust line includes CVT exhaust pipe I 7, 180° elbow 8, and CVT exhaust pipe II 9 that are sequentially connected. The 180° elbow 8 is higher than the CVT exhaust pipe I 7 and the CVT exhaust pipe II 9. A lowest point of the elbow 8 is at a height of 1,060 mm to increase the height of the CVT exhaust line and improve wading performance. An exhaust port of the CVT exhaust pipe II 9 faces the engine exhaust pipe 11 inside the insulation cover 10 and has an exhaust direction along a length direction of the engine exhaust pipe 11, allowing a discharged gas to enter the insulation cover 10 to form a cooling gas path for heat dissipation of the engine exhaust pipe 11.

In this embodiment, air filter 13 of an engine is connected to air filter intake pipe I 12 through air filter intake pipe II 27. An intake port of the air filter intake pipe I 12 is at a same height as the intake port of the CVT intake pipe, namely 1,250 mm. Air filter exhaust pipe 29 is connected to an engine. A middle position inside the air filter 13 is provided with filter screen 28. The filter screen 28 separates an inner chamber of the air filter 13 into a left filter chamber and a right filter chamber. Bottoms of the left filter chamber and the right filter chamber are respectively provided with front leakage port 31 and rear leakage port 32. The front leakage port 31 and the rear leakage port 32 are connected to a drainage line. The bottom of the left filter chamber is provided with collection channel 30. The front leakage port 31 is provided at a lowest point of the collection channel 30. The air filter 13 is further connected to a crankcase of the ATV. Exhaust gas from the crankcase enters the air filter 13 through crankcase connection pipe 37, and an intake part is provided with raised pipe 38. The air filter 13 adopts a layered design. Once water enters the air filter 13, it will be discharged from the bottom of the air filter, which to some extent prevents the water from entering an engine combustor and the crankcase, further maximizing a wading depth. In addition, the drainage line (including left filter chamber drainage pipe 25 and right filter chamber drainage pipe 26) is transparent and can visually display the water accumulation condition therein. A tail end of the drainage line is provided with drainage valve 36, which is configured to timely discharge the water inside the air filter.

This embodiment improves the ventilation structure of an original fuel tank cap by replacing the original fuel tank cap with a sealed fuel tank cap and moving the ventilation structure to an oil pump cover to ensure the wading depth. In this embodiment, the intake and exhaust pressures are balanced through an internal line (when fuel evaporates, the pressure inside the fuel tank increases, and when fuel is consumed, the pressure inside the fuel tank decreases), and the air is filtered during intake. The fuel system includes the fuel tank 14. The fuel tank 14 is connected to a ventilation line. A ventilation port of the ventilation line is at a height of 1,250 mm. The oil pump cover 15 of the fuel tank 14 is connected to ventilation pipe I 16. The ventilation pipe I 16 is connected to fuel tank exhaust pipe 18 and fuel tank intake pipe 20 through tee junction I 17. The fuel tank exhaust pipe 18 and the fuel tank intake pipe 20 are connected to ventilation pipe II 24 through tee junction II 23. The fuel tank exhaust pipe 18 is provided with exhaust one-way pressure valve 19. The fuel tank intake pipe 20 is provided with intake one-way pressure valve 21 and gasoline filter 22. An opening pressure of the exhaust one-way pressure valve 19 is greater than an opening pressure of the intake one-way pressure valve 21. The oil pump adopts a circulating ventilation design and a pressure valve structure to achieve separate intake and exhaust and prevent fuel leakage. The intake opening pressure is 2 kpa and the exhaust opening pressure is 5 kpa. The pressure is supplemented in a timely manner during intake to prevent insufficient fuel supply. Meanwhile, a micro gasoline filter is used for filtration during intake to protect the cleanliness of the fuel system.

In this embodiment, the wheel 4 is provided with anti-detachment hub 33 including pressure plate 34. A diameter of front wheel 4.1 is equal to a diameter of rear wheel 4.2, and a width of the rear wheel 4.2 is greater than a width of the front wheel 4.1. The dimensions of front and rear tires are increased to increase the ATV's buoyancy in water and improve its wading performance. In addition, considering that the center of gravity of the ATV and personnel is located at the rear during driving, the width of the rear wheel 4.2 is greater than that of the front wheel 4.1, so as to improve driving stability during wading. With the ant-detachment hub including the pressure plate, the tires are suitable for complex road conditions. The tire pressure can be reduced to increase the contact area with the ground, thereby enhancing road holding and avoiding air leakage.

In this embodiment, a one-to-many wire of the ATV is connected in a waterproof manner, and the waterproof performance of a wire connector meets the IP67 standard.

Certainly, the above-mentioned embodiments are merely preferred embodiments of the present disclosure and are not to be construed as limiting the scope of the embodiments of the present disclosure. The present disclosure is not limited to the above-mentioned examples, and equivalent changes, modifications, and the like made by those of ordinary skill in the art within the essential scope of the present disclosure should all fall within the scope covered by the patent of the present disclosure.

What is claimed is:

1. A high-trafficability all-terrain vehicle (ATV) for flooded and muddy roads, comprising a frame assembly, wheels, an engine power system, a continuously variable transmission (CVT) system, a cooling system, and a fuel system, wherein the cooling system comprises a radiator and a radiator fan, the radiator and the radiator fan are arranged at a front upper part of an ATV body;

wherein an insulation cover is provided outside an engine exhaust pipe of the engine power system;

wherein the CVT system comprises a CVT box; the CVT box is connected to a CVT intake pipe and a CVT exhaust line; the CVT exhaust line comprises a first CVT exhaust pipe, an elbow, and a second CVT exhaust pipe, the first CVT exhaust pipe, the elbow, and the second CVT exhaust pipe are sequentially connected; the elbow is higher than the first CVT exhaust pipe and the second CVT exhaust pipe; and an exhaust port of the second CVT exhaust pipe faces the engine exhaust pipe inside the insulation cover and has an exhaust direction along a length direction of the engine exhaust pipe.

2. The high-trafficability ATV for the flooded and muddy roads according to claim 1, wherein the wheel is provided with an anti-detachment hub, the anti-detachment hub comprises a pressure plate; and a front wheel has a diameter equal to a diameter of a rear wheel and a width smaller than a width of the rear wheel.

3. The high-trafficability ATV for the flooded and muddy roads according to claim 1, wherein the radiator is fixed and inclined at a 20-40° angle to a ground; the radiator is externally provided with an outer cover and a protective mesh; and two sides of the radiator are provided with protective brackets, the protective brackets are connected to a bumper.

4. A high-trafficability all-terrain vehicle (ATV) for flooded and muddy roads, comprising a frame assembly, wheels, an engine power system, a continuously variable transmission (CVT) system, a cooling system, and a fuel system, wherein the cooling system comprises a radiator and a radiator fan, the radiator and the radiator fan are arranged at a front upper part of an ATV body;

wherein an air filter of an engine is connected to a first air filter intake pipe; a middle position inside the air filter is provided with a filter screen; the filter screen separates an inner chamber of the air filter into a left filter chamber and a right filter chamber; bottoms of the left filter chamber and the right filter chamber are respectively provided with a front leakage port and a rear leakage port; and the front leakage port and the rear leakage port are connected to a drainage line.

5. The high-trafficability ATV for the flooded and muddy roads according to claim 4, wherein the drainage line is transparent and comprises a tail end provided with a drainage valve.

6. The high-trafficability ATV for the flooded and muddy roads according to claim 5, wherein the bottom of the left filter chamber is provided with a collection channel; and the front leakage port is provided at a lowest point of the collection channel.

7. The high-trafficability ATV for the flooded and muddy roads according to claim 4, wherein the bottom of the left filter chamber is provided with a collection channel; and the front leakage port is provided at a lowest point of the collection channel.

8. A high-trafficability all-terrain vehicle (ATV) for flooded and muddy roads, comprising a frame assembly, wheels, an engine power system, a continuously variable transmission (CVT) system, a cooling system, and a fuel system, wherein the cooling system comprises a radiator and a radiator fan, the radiator and the radiator fan are arranged at a front upper part of an ATV body;

wherein the fuel system comprises a fuel tank; the fuel tank is connected to a ventilation line; an oil pump cover of the fuel tank is connected to a first ventilation pipe; the first ventilation pipe is connected to a fuel tank exhaust pipe and a fuel tank intake pipe through a first tee junction; the fuel tank exhaust pipe and the fuel tank intake pipe are connected to a second ventilation pipe through a second tee junction; the fuel tank exhaust pipe is provided with an exhaust one-way pressure valve; and the fuel tank intake pipe is provided with an intake one-way pressure valve and a gasoline filter.

9. The high-trafficability ATV for the flooded and muddy roads according to claim 8, wherein an opening pressure of the exhaust one-way pressure valve is greater than an opening pressure of the intake one-way pressure valve.

* * * * *